（12） United States Patent
Ozgul et al.

(10) Patent No.: US 9,870,038 B2
(45) Date of Patent: Jan. 16, 2018

(54) STATUS-SENSITIVE POWER OBSERVING SYSTEM

(71) Applicant: TURKCELL TEKNOLOJI ARASTIRMA VE GELISTIRME ANONIM SIRKETI, Kocaeli (TR)

(72) Inventors: Mehmet Emin Ozgul, Kocaeli (TR); Cem Ayyildiz, Kocaeli (TR); Servet Ayok, Kocaeli (TR)

(73) Assignee: TURKCELL TEKNOLOJI ARASTIRMA VE GELISTIRME ANONIM SIRKETI, Kocaeli (TR)

( * ) Notice: Subject to any disclaimer, the term of this patent is extended or adjusted under 35 U.S.C. 154(b) by 314 days.

(21) Appl. No.: 14/369,261

(22) PCT Filed: Dec. 12, 2012

(86) PCT No.: PCT/IB2012/057205
§ 371 (c)(1),
(2) Date: Jun. 27, 2014

(87) PCT Pub. No.: WO2013/098688
PCT Pub. Date: Jul. 4, 2013

(65) Prior Publication Data
US 2015/0033059 A1    Jan. 29, 2015

(30) Foreign Application Priority Data

Dec. 29, 2011 (TR) ............................. a 2011 13216

(51) Int. Cl.
G06F 1/00      (2006.01)
G06F 1/28      (2006.01)
H04W 4/00      (2009.01)
G06Q 50/06     (2012.01)
G06F 1/06      (2006.01)

(52) U.S. Cl.
CPC ................. *G06F 1/28* (2013.01); *G06F 1/06* (2013.01); *G06Q 50/06* (2013.01); *H04W 4/005* (2013.01)

(58) Field of Classification Search
CPC ........................................................ G06F 1/26
USPC ............................................................ 713/340
See application file for complete search history.

(56) References Cited

U.S. PATENT DOCUMENTS

| 7,234,068 B2 * | 6/2007 | Nonogaki | G06F 11/3062 |
| | | | 702/186 |
| 7,424,666 B2 * | 9/2008 | Chandwani | G06F 11/0724 |
| | | | 714/799 |
| 7,643,849 B2 * | 1/2010 | Lu | G06F 3/1431 |
| | | | 455/556.1 |

(Continued)

OTHER PUBLICATIONS

Dusit Niyato et al. "Machine-to-machine communications for home energy management system in smart grid", IEEE Communications Magazine, IEEE Service Center, Piscataway, US, vol. 49, No. 4, Apr. 1, 2011 (Apr. 1, 2011), pp. 53-59, XP011372658, ISSN: 0163-6804.*

*Primary Examiner* — Vincent Tran
(74) *Attorney, Agent, or Firm* — Ladas & Parry LLP

(57) ABSTRACT

The present invention relates to a status-sensitive power observing system (1) which enables to observe power consumption of interconnected embedded systems under different operating conditions together with the said operating condition information and form real-like power consumption models thereof.

2 Claims, 1 Drawing Sheet

(56) References Cited

U.S. PATENT DOCUMENTS

| | | | |
|---|---|---|---|
| 8,461,725 B1* | 6/2013 | Stubbs | H01H 9/54 307/140 |
| 2002/0193144 A1* | 12/2002 | Belski | G01D 4/004 455/557 |
| 2006/0229847 A1* | 10/2006 | Nakajima | G01R 21/133 702/183 |
| 2010/0001590 A1* | 1/2010 | Litwack | H05B 37/0281 307/131 |
| 2010/0090862 A1* | 4/2010 | Dubrow | H04Q 9/00 340/870.01 |
| 2010/0162026 A1* | 6/2010 | Gross | G06F 11/3058 713/400 |
| 2010/0235840 A1* | 9/2010 | Angaluri | G06F 1/329 718/102 |
| 2011/0167286 A1 | 7/2011 | Varadarajan | |
| 2012/0016606 A1* | 1/2012 | Petit | G06F 1/3206 702/61 |
| 2012/0054527 A1* | 3/2012 | Pfeifer | G06F 1/266 713/340 |
| 2012/0084030 A1* | 4/2012 | Kitagawa | G05B 23/0283 702/61 |
| 2012/0271472 A1* | 10/2012 | Brunner | G06F 1/3209 700/295 |
| 2013/0042125 A1* | 2/2013 | Pearse | H04Q 1/03 713/320 |
| 2013/0117373 A1* | 5/2013 | Umehara | H04M 3/42374 709/204 |

\* cited by examiner

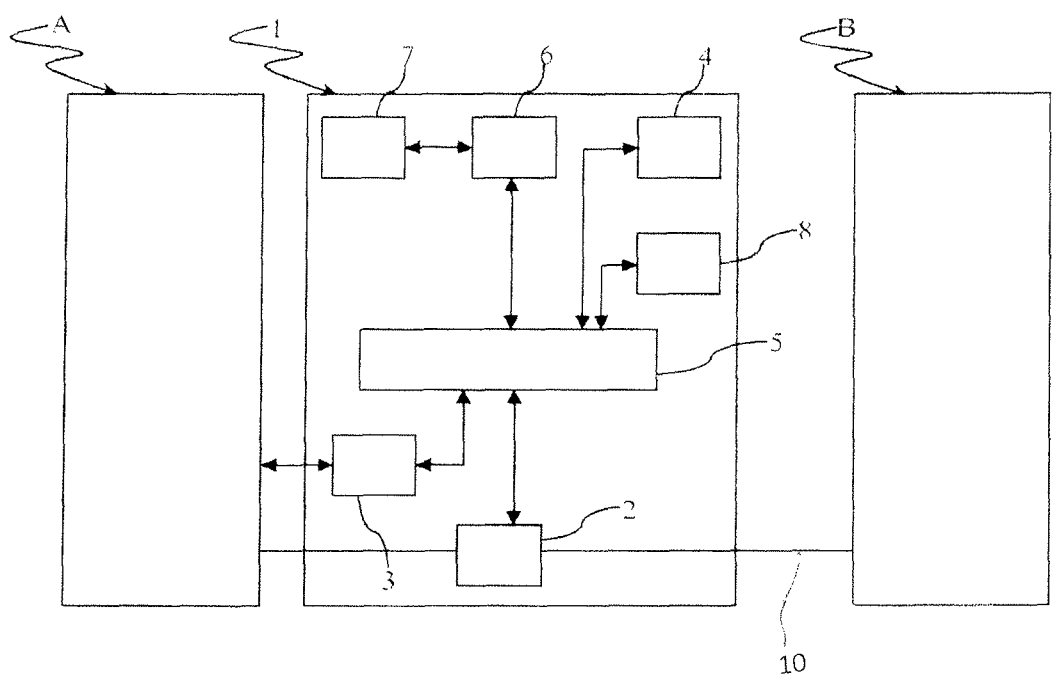

STATUS-SENSITIVE POWER OBSERVING SYSTEM

RELATED APPLICATION INFORMATION

This application is a 371 of International Application PCT/IB2012/057205 filed 12 Dec. 2012 entitled "a Status-Sensitive Power Observing System", which was published on the English language on 4 Jul. 2013 with International Publication Number WO 2013/098688 A1, and which claims priority from Turkish Application No.: 2011-13216 filed 29 Dec. 2011, the content of which is incorporated herein by reference.

TECHNICAL FIELD

The present invention relates to a status-sensitive power observing system which enables to observe power consumptions of interconnected embedded systems under different operating conditions together with the said operating condition information and set nearly real-time power consumption models thereof.

BACKGROUND OF THE INVENTION

Today, interconnected embedded systems called as machine to machine communication systems (M2M) are used in order to establish communication between two machines without need for human. The said M2M systems are systems which are generally powered by battery located on thereof without a power supply that is external and connected to electricity grid and expected to carry on their functions for a long time. For this reason, by calculating power consumptions of M2M systems precisely; operating methods, cycles and times thereof suited for the project should be planned and thus, the most economical energy solution that will fulfil requirement of the system should be selected. In order to ensure that energy consumption remains within economic criteria while expected functions are being carried out, operating statuses which comprise different function sets in M2M systems and thus display different power consumption characteristics are used. The following can be given as example for these operating statuses: deep sleep mode where M2M system can become operative again only by external cut off signal and all systems including processor and RAM are closed, sleep mode where status info of the processor is stored but it is remained in sleep mode and the data stored in the RAM are kept, limited operating mode where processor and peripheral units selected run but communication interfaces are closed, and full operating mode where all components including communication interfaces run actively.

When M2M systems are designed, operating statuses, which are given as example above and can be defined in addition to these, are determined and transitions between these operating statuses are defined in order that M2M systems perform the function to be realized. Power consumption profile of a M2M system that will perform a specific function is displayed by distribution of total power consumption, made by it in order to perform the said function, by time.

In the state of the art, two basic methods are used in order to determine power consumption profiles of M2M systems.

First one of these methods is based on determining amounts of power consumption, which are expected to be consumed by components composing M2M system in different operation statuses, from amounts of nominal consumption, which are involved in technical specification documents for these components. Since it cannot be expected to have common operating status definitions for each component, general system operating statuses are defined and it is tried to match each operating status of components with system operating statuses. The said method increases burden in M2M system design. Even if system power consumption is observed by time, noticing mistakes concerning that matches of component operating status and system operating status anticipated in design could not be realized in practice can be difficult because these observations which comprise additive (cumulative) power information cannot be associated with information of operating statuses. Nominal power consumption values of components included in technical specification documents are theoretical values and may vary by peripheral devices used in practice, application methods and operating time. In order to be able to notice these changes, it is required to measure, observe and evaluate power consumption of each component separately at the stage of prototype production tests. Due to the fact that changes which may occur either in production or because of operating time cannot be noticed, as long as they are not measured, in results of observations made at the stage of prototype; systems designed with this method use up their batteries early because they consume power more differently than expected or huge-sized and costly batteries are used to the extent that they are not needed to meet these changes that cannot be predicted during design.

Another method used for determining power consumption profiles of M2M systems in the state of the art is to set statistical models for devices and operating conditions and make use of simulation applications using these models in design. In the said method: operating conditions which are closest to normal are created for M2M devices; power consumptions of these devices are measured within times when operating status cycles thereof will be repeated a few times; and by constructing time-dependent consumption profile by these measurement results, a statistical model is set by using this profile. In order to set a statistical model without making measurement in an attempt to reduce costs, nominal power consumption values of components provided in technical specification documents are used as well. Deviation of variables included in the statistical model are high and the said deviations cannot be supposed to apply to all operating life of the system designed because it is not possible to provide all conditions, which will be encountered by the M2M device in real life, in case of measurement; know which operating statuses will be operated how often and for how long; and it is tried to predict differences to occur due to production and depreciation. Whereas in a method where no measurement is carried out, addition of greater uncertainties in comparison to statistical model is inevitable. In the event that difference which will occur because of high deviations of variables defining the statistical model is applied to system design, the system offers uneconomic battery solutions or in the event that it is not applied, operating life and capabilities of the system do not take place as designed. In addition, owing to the fact that sensitiveness of the said deviations may be low, it is likely that these deviations fail to satisfy the expectations accordingly even if they are applied to the system design.

The United States patent document no. US2011/0167286 discloses a power management system. The said system comprises: a management console which is in communication with a client computer, a main server, and communication mechanisms within network. The system also comprises power management tools along with one or more computing devices. Computing devices have processor, persistent storage, preferably display screen, operating system, and one or more communication mechanisms such as routers, network keys which are in communication with the power management server. The power management tool is also in communication with one or more power management servers. The power management tool can operate in on-line or off-line statuses. The said power management tool keeps data in chronological order using persistent storage. The power management server is in communication with the power management tool in cases where the power management tool is in on-line status. And, the client computer records principles of power and other databases specific to the client. The power management server and the power management agent are interconnected by means of a secure communication protocol. The power management server records data regarding power use, application use, user activity and system activity which are received from power management tools periodically, in the persistent storage. The said server prepares reports with respect to these data.

SUMMARY OF THE INVENTION

An objective of the invention is to realize a status-sensitive power observing system which enables to obtain operating status info from M2M system and store these info by continuously measuring power consumption values of operating M2M system in a precise manner simultaneously with the said measurements.

Another objective of the invention is to realize a status-sensitive power observing system which enables to create a realistic power consumption profile of M2M system.

A further objective of the invention is to realize a status-sensitive power observing system which enables to update power consumption profile dynamically while M2M system is in operation.

A still further objective of the invention is to realize a status-sensitive power observing system which enables to detect inconsistencies between design of operating condition and practice.

A yet further objective of the invention is to realize a status-sensitive power observing system which enables to detect M2M sub-systems that can be break down in active use for a variety of reasons.

DESCRIPTION OF THE INVENTION

"A Status-Sensitive Power Observing System" realized to fulfil the objectives of the present invention is shown in the figure attached, in which:

FIG. 1 is a schematic view of the inventive power observing system.

The components illustrated in the FIGURE are individually numbered, where the numbers refer to the following:
1. Power observing system
2. Power meter
3. Status info notification unit
4. Real-time clock
5. Processor
6. Permanent memory
7. User interface
8. Clock signal counter
A. M2M system
B. M2M system power supply The inventive power observing system (1) comprises;
at least one power meter (2) which is disposed on power transmission line located between M2M system (A) and power supply of the M2M system (A), and enables to measure the power taken from the power supply (B) by the M2M system (A) continuously;
at least one status info notification unit (3) which is connected to M2M system (A) and enables to determine instant operating status of the M2M system (A) such as deep sleep, sleep, limited operation, full operation;
at least one real-time clock (4) which enables to present time information of the measurements carried out relative to a constant definite moment;
at least one processor (5) which creates power consumption profile by receiving power measurement values measured from the power meter (2), operating status of the M2M system (A) from the status info notification unit (3), time info from the real-time clock (4) and associating the said info with one another;
at least one permanent memory (6) which stores the power consumption profile created by the processor (5); and
at least one user interface (7) which enables to reach the power consumption profile stored on the permanent memory (6) externally.

The inventive power observing system (1) also comprises at least one clock signal counter (8) which enables to detect time info relative to the moment when power measurement begins.

The power meter (2) provided in the inventive power observing system (1) is disposed on the power transmission line (10) between the M2M system (A) and the power supply (B) which enables to supply required power for the M2M system (A) 25 to operate to the M2M system (A). With the power meter (2), the power transmitted to M2M system (A) by the power supply (B) is measured as a signal continuously.

The status info notification unit (3) provided in the inventive power observing system (1) is connected to the M2M system (A) and it notifies the power observing system (1) of operating status such as deep sleep, sleep, limited operation, full operation and changes of the operating status of M2M system (A) at that moment. Digital values represented by values of grouped digital input output legs, digital values transferable by means of UART serial interfaces, digital values transferable by means of SPI and I2C serial data buses and communication protocols determining forms of these transfers are used in the status info notification unit (3).

The real-time clock (4) and the clock signal counter (8) provided in the inventive power observing system (1) enable to detect time info relating to measurements carried out. The real-time clock (4) presents time info relative to a constant and definite moment, whereas the clock signal counter (8) presents time info relative to a moment when the power observing system (1) begins operation. In a preferred embodiment of the invention, the clock signal counter (8) is used in cases where relativity of time info can be amended, sensitiveness thereof may be low and the system (1) is expected to consume low energy.

The processor (5) provided in the inventive power observing system (1) reads values measured by the power meter (2) continuously, in the form of digital values momentarily. The processor (5) combines the measurement values read by power meter (2) with the time info, which is provided by the real-time clock (4) or the clock signal counter (8), and the status info, which is provided by the M2M system (A) over the status info notification unit (3), and stores them on the permanent memory (6) via a cyclical data structure.

By means of the user interface (7) provided in the inventive power observing system (1), either the M2M system (A) or another external system is enabled to reach power consumption values stored on the permanent memory (6) which are associated with the time and the operating status of the M2M system (A). In a preferred embodiment of the invention, the user interface (7) comprises UART, SPI and I2C communication interfaces.

With the inventive power observing system (1), since the M2M system (A) can reach power consumptions in its operating statuses by reaching the power consumption records on the power observing system (1), it can arrange transitions between the operating statuses using these values at the time of operation. Power consumption records can also be reached by means of a remote system over the M2M system (A) by reaching the M2M system (A).

With the inventive power observing system (1), statistical models very close to reality can be created using power consumption profiles associated with real operation statuses concerning the M2M system (A), and more realistic and cost-effective operation cycles and power consumption plans can be made for projects expected to be realized by means of M2M systems (A) using these models in operation simulations.

It is possible to develop various embodiments of the inventive "status-sensitive power observing system (1)", it cannot be limited to examples disclosed herein and it is essentially according to claims.

The invention claimed is:

1. A power observing system comprising:
  (a) an M2M system capable of operating in a plurality of operating statuses, wherein the M2M system consumes a different amount of power when it operates in each of the plurality of operating statuses;
  (b) a power supply for transmitting power to the M2M system, wherein the power supply is connected to the M2M system by a power transmission line and is not connected to an electricity grid;
  (c) at least one power meter disposed on the power transmission line between the M2M system and the power supply and operatively connected continuously to measure values of the power transmitted to the M2M system by the power supply;
  (d) at least one status info notification unit connected to the M2M system and operative to determine which of the plurality of operating statuses the M2M system is operating in at a given moment;
  (e) at least one real-time clock configured to present time information for the power observing system at a desired moment in time, and at least one clock signal counter configured to present time information relative to a time when measurement of values of the power transmitted to the M2M system starts;
  (f) at least one processor configured for receiving the power measurement values from the power meter, operating status from the status info notification unit and time information from the real-time clock or the clock signal counter, for creating a power consumption profile that associates the power measurement values, operating status and time information to create a real-time power consumption profile of the M2M system that is usable to determine how to operate the M2M system in an energy efficient manner and to arrange transitions between the plurality of operating statuses based on the measured values, and for storing the power consumption profile in a memory; and
  (g) at least one user interface configured to reach the power consumption profile stored in the memory;
    wherein the at least one processor creates the power consumption profile with time information from the clock signal counter selectively under conditions where the power observing system is expected to consume low energy.

2. The power observing system according to claim 1, wherein the power supply is a battery.

* * * * *